United States Patent [19]
Thielen

[11] Patent Number: 6,092,144
[45] Date of Patent: Jul. 18, 2000

[54] METHOD AND SYSTEM FOR INTERRUPT-RESPONSIVE EXECUTION OF COMMUNICATIONS PROTOCOLS

[75] Inventor: David Thielen, Redmond, Wash.

[73] Assignee: Microsoft Corporation, Redmond, Wash.

[21] Appl. No.: 09/436,009

[22] Filed: Nov. 9, 1999

Related U.S. Application Data

[63] Continuation of application No. 08/695,741, Aug. 12, 1996, Pat. No. 6,003,108, which is a continuation of application No. 08/085,449, Jun. 30, 1993, abandoned.

[51] Int. Cl.[7] .............................. G06F 9/48; G06F 13/12; G06F 13/42
[52] U.S. Cl. ......................... 710/269; 710/260; 710/268; 709/200
[58] Field of Search .................................. 710/260, 263, 710/268, 269, 129, 264, 105, 36, 48, 52; 370/257; 709/200, 230, 231, 203, 213; 340/825.06

[56] References Cited

U.S. PATENT DOCUMENTS

| | | |
|---|---|---|
| 5,787,248 | 7/1998 | Zupcsics et al. . |
| 5,819,096 | 10/1998 | Nelson et al. . |
| 5,903,718 | 5/1999 | Marik . |
| 5,974,496 | 10/1999 | Miller . |

*Primary Examiner*—Gopal C. Ray
*Attorney, Agent, or Firm*—Workman, Nydegger & Seeley

[57] ABSTRACT

A method and system for interrupt-responsive execution of a communications protocol which obtains data sent by a sending computer a receiving computer via a communications interface. An interrupt handler routine is provided which includes the communications protocol. When data requested by an application executing on the receiving computer is received by the communications interface, an interrupt is sent by the communications interface to the CPU in the receiving computer. When this interrupt is received, the interrupt handler routine is immediately accessed and executed to timely execute the communications protocol. As a result, the communications protocol obtains the data from the communications interface before it can be overwritten by new data sent by the sending computer. The application program can then be executed at a later time to read the data obtained.

4 Claims, 10 Drawing Sheets

METHOD AND SYSTEM FOR INTERRUPT-RESPONSIVE EXECUTION OF COMMUNICATIONS PROTOCOLS

RELATED APPLICATIONS

This application is a continuation of U.S. patent application Ser. No. 08/695,741, filed Aug. 12, 1996, and entitled "Method and System for Interrupt-Responsive Execution of Communications Protocols", U.S. Pat. No. 6,003,108, which is a file wrapper continuation of U.S. patent application Ser. No. 08/085,449, filed Jun. 30, 1993, now abandoned, and entitled "Method and System for Interrupt-Responsive Execution of Communications Protocols." The foregoing patent applications are incorporated herein by reference.

BACKGROUND OF THE INVENTION

1. The Field of the Invention

The present invention relates generally to the field of data communications and, more particularly, to communications protocols which control the flow of data from a modem to a computer.

2. The Prior State of the Art

In order to transfer digital data from a sending computer to a receiving computer a communications link must be established between the computers. In many instances the communications link is established over a telephone line. Such a communications link between computers over a telephone line is shown in FIG. 1. In FIG. 1, a receiving computer 100 communicates with a sending computer 110 to receive data over a communications link via a receiving modem (modulator/demodulator) 120. A universal asynchronous receiver transmitter (UART) 130 is provided within an I/O unit 145 within the receiving computer 100, which serves as a communications interface and buffers the data in a UART buffer 132. A sending modem 135 is employed at the sending computer 110 to encode the digital data into a signal sent over the telephone line using frequency modulation techniques. The data is then sent over the telephone line and received by the receiving modem 120 at the receiving computer 100. The receiving modem demodulates the signal to extract the digital data from the signal. The receiving modem 120 sends the digital data to the UART 130 which stores the digital data in the UART buffer 132. The UART 130 sends an interrupt to the CPU 140 to signal the arrival of the digital data. At some point thereafter, the CPU 140 obtains the digital data from the UART 130 and stores it in a communication port 156 in the memory 150 in the receiving computer via an I/O unit 145. The communications port 156 is a dedicated memory location for storing data received over the communications link.

A data transfer as described above is often initiated by an application program 152 executing on the CPU 140 in the receiving computer 100. When the CPU 140 is executing the application program 152 and encounters an instruction to read remote data which the sending computer 110 must provide, the receiving computer 100 sends an appropriate request to the sending computer 110 over the communications link. At some point thereafter, the sending computer 110 services the request and asynchronously sends the requested data back over the communications link to the UART 130. In this transaction, once the receiving computer 100 has sent the request to the sending computer 110 to send the data, the receiving computer 100 cannot predict the timing of the arrival of the data in the UART 130 because the data arrives asynchronously relative to the clock of the receiving computer 100.

Because the data transfer over the communications link is asynchronous, the receiving computer 100 must provide a mechanism to control the flow of the data to ensure that the data is obtained and processed in a timely fashion. Typically, this mechanism comprises a number of communications protocols which control the flow of the data from the UART 130. These protocols are subprograms that perform functions such as obtaining the data from the UART 130, and ensuring that the CPU 140 does not request data from the UART 130 before the data has arrived in the UART 130 or after the communications port 156 has become full. The protocols are typically implemented by the receiving computer through computer subprograms provided by the application program 152 executing on the computer which the application program 152 calls to obtain the data at some point after the data has begun to arrive in the UART 130. For example, the application program 152 performs a protocol 154 which is a subprogram that obtains the data from the UART 130.

Typically, however, the application program 152 may not call the protocols until some time after the data has begun to arrive in the UART 130. After the receiving computer 100 sends the request, there is an inherent time delay. Since it is impossible to anticipate when the data will arrive, the receiving computer 100 must then await the actual arrival of the data before continuing execution of the application program. Thus, it is desirable to devote the receiving computer 100 to other operations while awaiting for arrival of the data. Where the operating system executing on the receiving computer 100 is a multitasking system, for example, the operating system may assign other tasks to be performed by the CPU 140 of the receiving computer 100, such as executing other application programs or operating system routines. Thus, even when the receiving computer 100 receives an interrupt from the UART 130 to indicate the requested data has been received by the communications interface, the requested data cannot be obtained by the receiving computer 100 from the UART 130 until the operating system executing on the receiving computer 100 returns control of the CPU 140 to the application program 152 which requested the data. Only when so reassigned does the application program 152 execute the protocols to obtain the data from the UART 130 and provide the data to the application program.

In many computer systems, though, it is not possible for the receiving computer 100 to immediately return control of the CPU 140 to the application program 152 at the time the data is first received by the UART 130. At this time, as mentioned above, the CPU 140 receives an interrupt. This interrupt is a hardware interrupt sent over a direct line from the UART 130 to the receiving computer 100 to notify the receiving computer 100 that the data has been received. When the interrupt is received, the task currently being performed is interrupted, and an interrupt handler routine (not shown) is executed. Some current popular operating systems, however, do not allow execution of the application program 152 at this time (referred to herein as "interrupt time"). In these operating systems, the application program 152 is merely engaged to be scheduled to resume execution at some point after completion of the interrupt handler routine.

The receiving computer 100 then returns to performing the interrupted task. Then, any other tasks that already have been scheduled that have higher priority than the application program 152 are scheduled to be performed ahead of the application program 152. Only when the application program 152 is scheduled by the operating system to continue execution are the communications protocols executed to obtain the data from the UART 130.

An example of such a current operating system is a current version of one mode of the Microsoft® Windows™ operating system, by Microsoft Corporation of Redmond, Wash. The Windows operating system implements a protection mechanism which protects critical code or data, such as the operating system kernel, from being altered. This mechanism does not allow an application program to access such critical code or data because an unwise or accidental alteration of the critical code or data could cause irreparable damage to the operating system. Because the interrupted task may have placed the receiving computer 100 in a state which allows alteration of the critical code or data, transferring control to the application program 152 at interrupt time would jeopardize the critical code or data because it could be altered by the application. Thus, when the CPU 140 is notified that data has been received by the UART 130, the operating system merely engages the application to be rescheduled for execution at a time during which the application program 152 can be executed without jeopardizing any critical code or data.

Unfortunately, if the application 152 is not scheduled for execution within a certain amount of time, the data sent to the receiving computer may be lost. The UART 130 stores the data in the UART buffer 132 and, as the requested data is received from the sending computer 110, awaits execution of the communications protocol 154 by the receiving computer to obtain the data. Because the size of the UART buffer 132 is limited, as new data continues to be received by the UART 130, the data stored in the UART buffer 132 will eventually be overwritten. If the application program 152 is not scheduled in time to read in the data before it is overwritten in the UART buffer 132, the requested data is lost before it can be read and utilized by the application program 152. Unfortunately an operating system which implements a protection mechanism as described above may not schedule the application program 152 within this amount of time. When this happens, the application program 152 does not receive the requested data.

SUMMARY OF THE INVENTION

It is an object of the present invention to prevent the loss of data transferred over a communications link.

It is another object of the invention to provide interrupt-responsive execution of communications protocols.

It is yet another object of the present invention to provide timely execution of communications protocols in a receiving computer in time to obtain requested data before it is overwritten in a communications interface.

It is a further object of the invention to alleviate, from applications which request data from a remote computer, the necessity of providing communications protocols.

Additional objects of the present invention will become apparent as the invention is more fully described below.

The above objects are realized by the present invention. The present invention provides interrupt-responsive execution of a communications protocol which obtains data from a communications link. The data is sent via the communications link by a sending computer to a receiving computer via a communications interface in the receiving computer which stores the data until obtained by the communications protocol. An interrupt handler routine which includes the communications protocol is provided within the receiving computer. When the data is received by the communications interface, an interrupt is sent by the communications interface to the CPU in the receiving computer. When this interrupt is received, the interrupt handler routine is immediately accessed and executed to timely execute the communications protocol. As a result, the communications protocol reads the data from the communications interface before it can be overwritten by new data sent by the sending computer.

The advantage provided by the present invention is realized in a computer system executed under control of an operating system that prohibits execution of an application program at the time an interrupt is received. Such an operating system protects critical code or data, such as the operating system kernel, from being altered at the time the interrupt is received. In such a computer system, when an instruction is encountered in the application program to read the data, the remaining application instructions to be executed in the application program are saved and alternative instructions are executed instead. These alternative instructions, which may include operating system instructions for performing operating systems routines or application instructions for performing other applications, perform other tasks scheduled by the operating system. The alternative instructions are executed until an interrupt is received from the communications interface indicating that the requested data has arrived.

In a preferred embodiment of the invention, when this interrupt is received from the communications interface, the alternative instructions are saved and the interrupt handler routine is immediately executed as follows. The interrupt handler routine is accessed with reference to an address stored in an entry in an interrupt table which corresponds to the communications interface from which the data was received. The accessed interrupt handler routine includes multiple communications protocols that perform functions which include obtaining the data from the communications interface that places the data into the communications port. Thus, execution of the interrupt handler routine provides timely execution of the multiple communications protocols to obtain the data from the communications interface before it is overwritten.

Upon completion of the interrupt handler routine, the previously executing alternative instructions are retrieved and executed. Thereafter, when the application program is scheduled, the remaining application instructions are retrieved and executed. As a result, even though the data is obtained from the communications interface immediately upon receiving the interrupt the application can still be scheduled to execute at a time that will not jeopardize any critical code. Also, the necessity of providing the communications protocols is alleviated from the application. Any number of communications protocols can be implemented within the interrupt handler routine to control the flow of this data from the communications interface, thereby removing the necessity of providing these communications protocols from the application program.

DETAILED DESCRIPTION OF THE PREFERRED EMBODIMENTS

Figure 1:
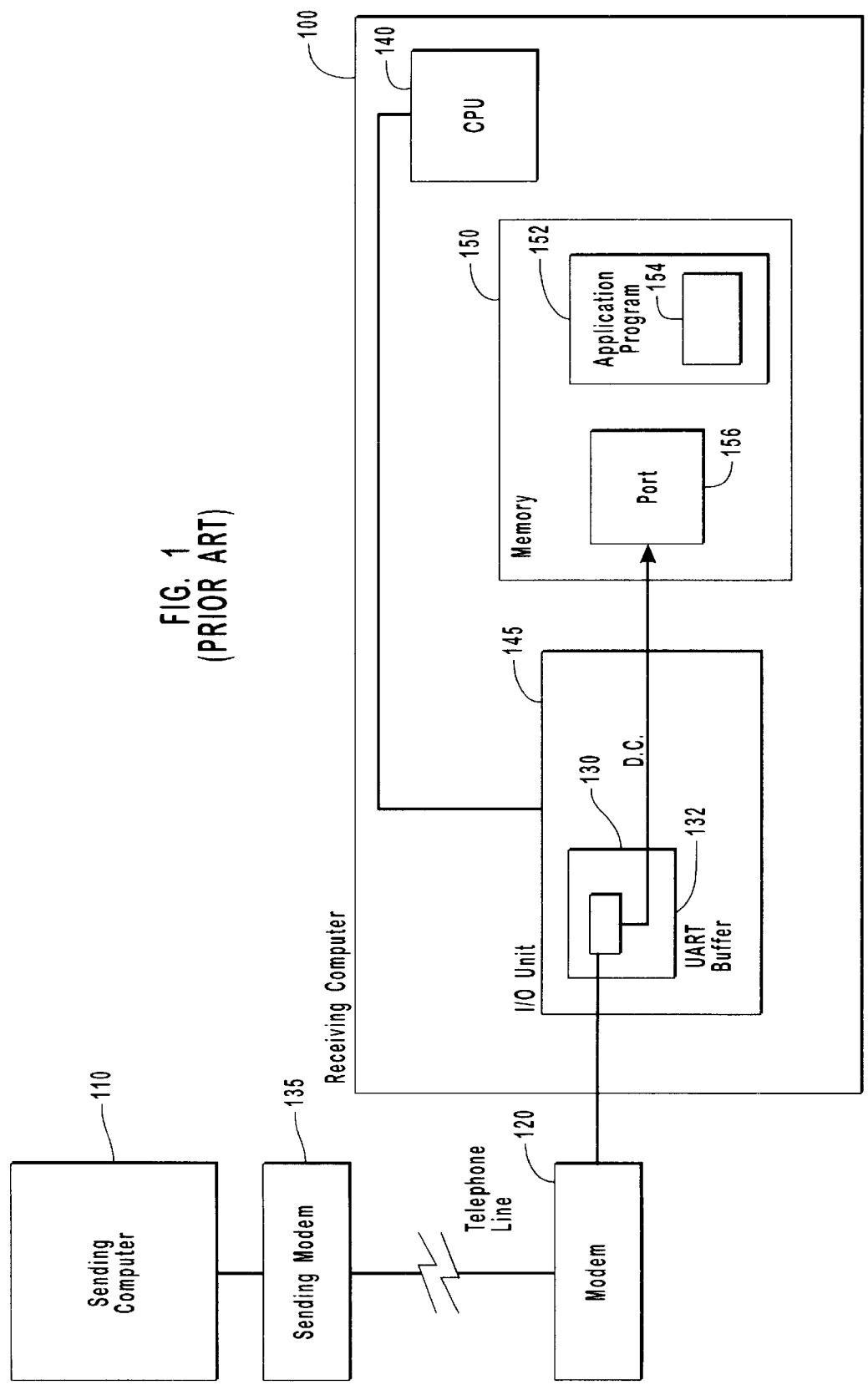
FIG. 1 is a block diagram of a prior art computer system.

The present invention prevents the loss of data transferred to a receiving computer. An example of such a loss of data can be described with reference to the computer system of FIG. 1. When the receiving computer 100 from FIG. 1 is executing the application program 152 and encounters an instruction to read the data from a sending computer 110 via a communications link, the receiving computer 100 sends an appropriate request to the sending computer 110 over the communications link. At some point thereafter, the sending computer 110 sends the data over the communications link to the UART 130 in the receiving computer 100, which stores the data in the UART buffer 132 until the receiving computer obtains the data from the UART 130.

The invention prevents the data from being overwritten in the UART 130 by new data that has been sent from the remote computer 110. The invention accomplishes this by providing timely execution of multiple communications protocols, which include a communications protocol that, when executed, obtains the data from the UART 130. Execution of the communications protocol is made timely by providing the communications protocol with a privilege level equal to that of an interrupt handler routine which invokes the communications protocol. The interrupt handler routine invokes the communications protocol without delay by executing, when an interrupt is first received indicating that the data has been received by the UART 130, the interrupt handler routine that performs the communications protocol having the same privilege level. Thus, the data is obtained from the communications interface before it can be overwritten by new data from the remote computer.

Figure 2:
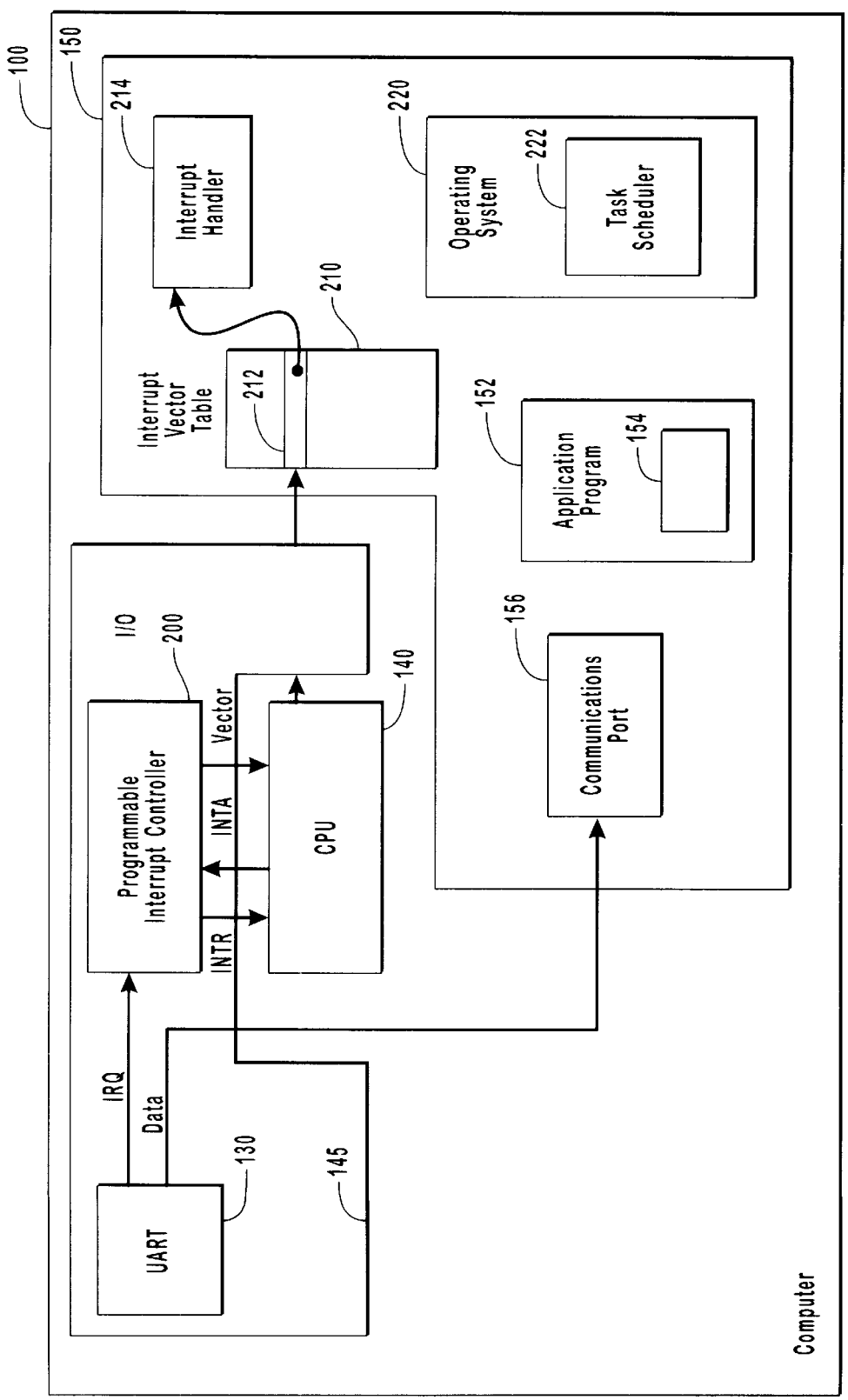
FIG. 2 is a block diagram which shows the prior art computer system in greater detail.

The advantage of the present invention can be illustrated with reference to the specific interrupt process performed by the prior art system of FIG. 1, which is shown in FIG. 2. As shown in FIG. 2, the CPU 140 receives an interrupt request (IRQ) from the UART 130. Specifically, the IRQ is received by a programmable interrupt controller 200 provided within the I/O unit 145 in the receiving computer 100. The IRQ indicates that the requested data has been received by the UART 130. The programmable interrupt controller 200 is, for example, an Intel 8259A interrupt controller which receives interrupt requests from various sources and informs the CPU 140 of these interrupt requests. The programmable interrupt controller 200 sends an interrupt request signal (INTR) to the CPU 140 to notify the CPU of the interrupt request from the UART 130. The CPU 140 acknowledges the INTR by sending an interrupt request acknowledgment signal (INTA) to the programmable interrupt controller 200.

When the CPU 140 acknowledges the INTR, the programmable interrupt controller 200 sends an interrupt vector number to the CPU 140, which identifies the UART 130 as the source of the interrupt request. The CPU 140 accesses an interrupt vector table 210 stored in the memory 150 via the I/O unit 145 and, using the interrupt vector number, calculates an address of an entry 212 in the interrupt vector table 210 which corresponds to the UART 130. The CPU 140 then transfers control to an interrupt handler routine 214 stored at an address in the memory 150 identified by the entry 212 in the interrupt vector table 210. The prior art interrupt handler routine 214 merely sends a request to an operating system 220 stored in the memory 150 to instruct a task scheduler 222 provided by the operating system 200 to engage the application program 152 to be scheduled. The interrupt handler 214 then transfers control back to the task previously being executed by the CPU 140 before receiving the interrupt request. Thus, the data is not obtained from the UART 130 until the application program 152 is eventually scheduled to continue execution. When the application program 152 is finally scheduled, the communications protocol 154 obtains the data from the UART 130, which places the data into the port 156.

Because the UART buffer 132 is of limited size, it can only hold a limited amount of new data from the remote computer. The UART 130 is, for example, a 16450 UART. The 16450 UARF is a well-known UART which has a UART buffer 132 having a buffer size of only two bytes: one byte holding data having been read in and one byte holding data being read in. After so much new data is written into the UART buffer 132, the originally written data is overwritten. If the application program 152 is not scheduled and executed within a certain amount of time, the communications protocol 154 may not be executed in time to obtain the data from the UART 130 before this overwriting of the data occurs. Where the operating system 220 is an operating system such as the Microsoft Windows operating system, which prevents the execution of an application at interrupt time, the communications protocol 154 is not executed until the operating system 220 schedules the application program 152 for continued execution.

A current version of the Microsoft Windows operating system takes advantage of a protection mechanism provided by the 80386 microprocessor which employs a number of privilege levels to which groups of code or data can be assigned. This mechanism defines four different privilege levels (ring 0–ring 3) of hierarchical protection, ring 0 being a more privileged level than ring 1, which is a more privileged level than ring 2, which is a more privileged level than ring 3, which is the least privileged level. As is well known, the 80386 microprocessor employs a segmented memory addressing scheme in which executable code is divided into different segments (code segment) and data is also stored in different segments (data segments). For example, the executable code in an application program is defined to be located within a specific code segment through which the application is accessed. Each code segment defined for the 80386 microprocessor has a corresponding privilege level. Thus, the application program 152 is stored in a code segment with a specific privilege level.

Figure 3:
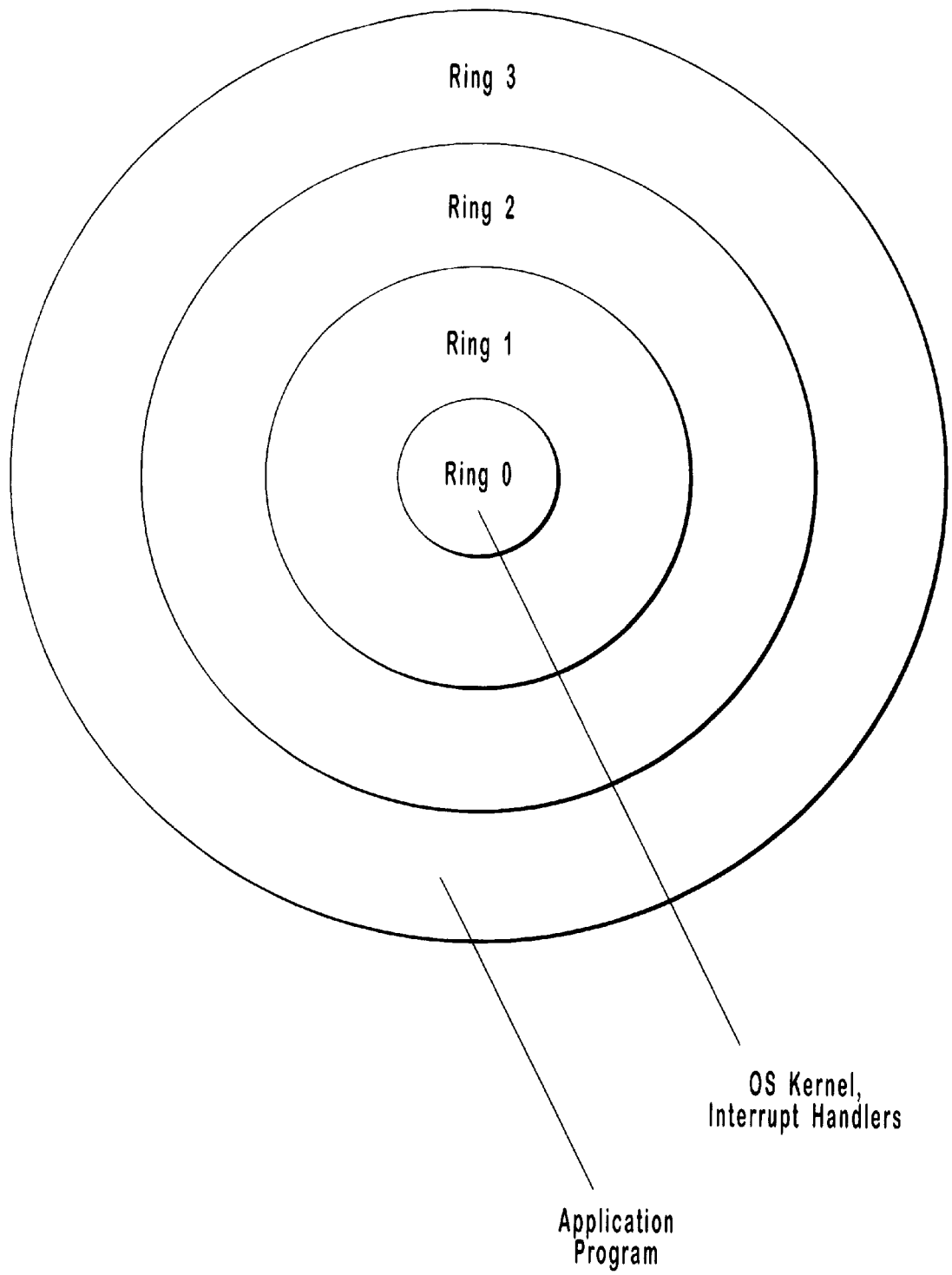
FIG. 3 is an illustration representing the privilege level system provided by the 80386 microprocessor and applied by the Microsoft Windows operating system.

In the Microsoft Windows operating system, the privilege level for different code segments is typically defined as illustrated by the diagram shown in FIG. 3. FIG. 3 is an illustration representing the privilege level system as provided by the 80386 microprocessor and applied by the Microsoft Windows operating system. As illustrated in FIG. 3, only the most critical code, such as the Windows operating system kernel or interrupt handlers, resides at ring 0. Thus, a code segment storing an interrupt handler would have a privilege level of 0. Application programs, on the other hand, typically reside in ring 3. That is, a code segment storing the application code would have a privilege level of 3. In the 80386 microprocessor, the privilege level for each code segment is defined by a designated bit in a corresponding code segment descriptor. The code segment descriptor is located in an entry in an appropriate segment descriptor table maintained by the 80386 microprocessor, which is referenced when the program in the code segment is accessed.

Figure 4A:
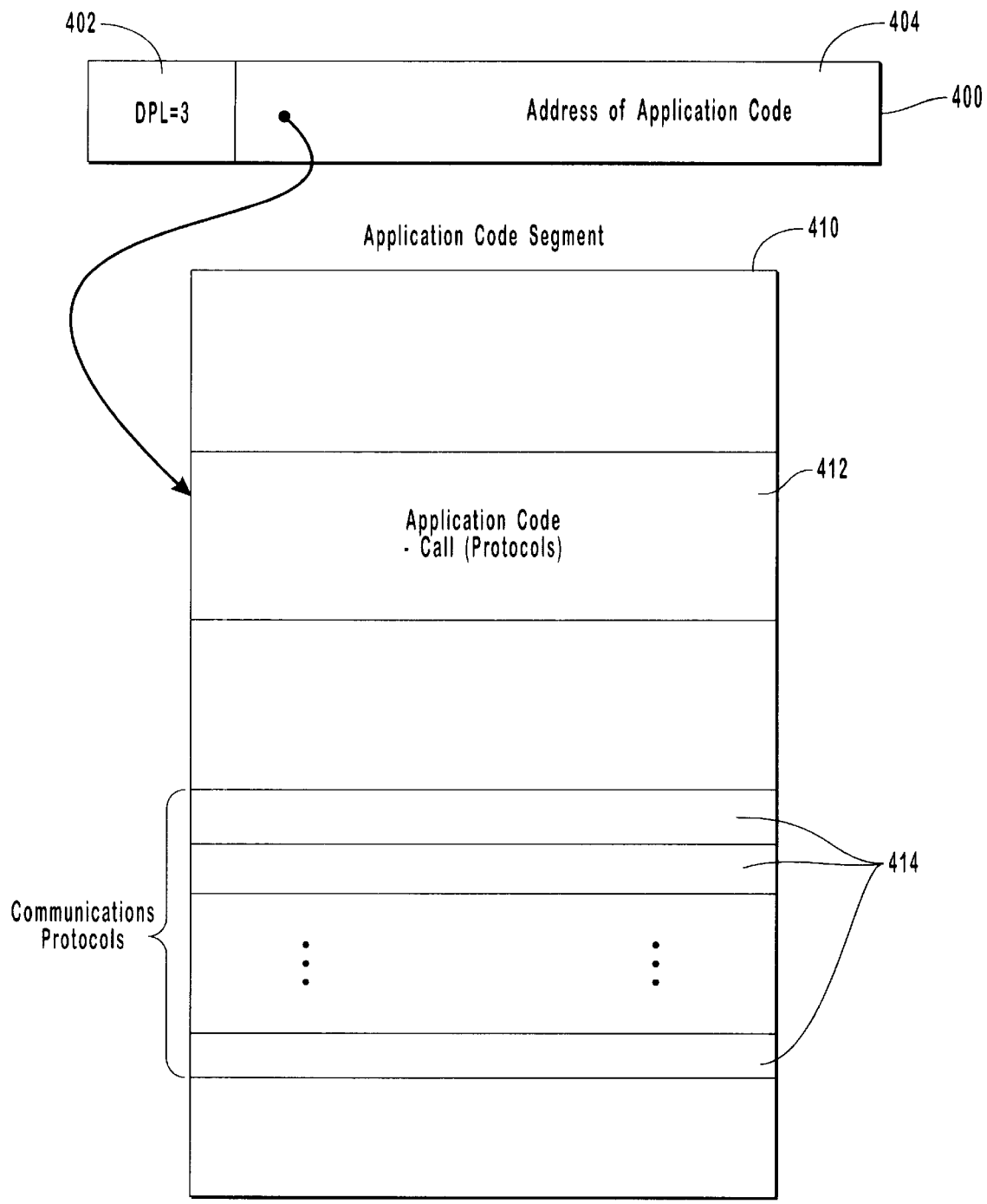
FIG. 4a is an illustration of a prior art code segment which stores an application that executes communications protocols.

The prior art code segment and code segment descriptor which implement the application program 152 discussed above are shown in FIG. 4a. In FIG. 4a, a code segment descriptor 400 is provided, which is an 80386 code segment descriptor. The code segment descriptor 400 includes a descriptor privilege level (DPL) 402 and an address 404 of the application code which implements the application program 152. The code segment descriptor 400 describes an application code segment 410 which is an 80386 code segment. The application code segment 410 contains the application code 412 and one or more communications protocols 414, which include the communications protocol 154 discussed above. Because the application code segment 410 implements an applications program, the Windows operating system assigns the application code segment 410 a descriptor privilege level 402 of 3 (DPL=3.)

In the privilege mechanism provided by the 80386 microprocessor, whenever an executing program attempts to transfer control to another program in a different code segment, the microprocessor compares the privilege level of the code segment that stores the program attempting to make the transfer to the privilege level of the code segment that stores the program to which the transfer is being attempted. If the descriptor privilege level of each program is equal, the transfer is allowed by the 80386 microprocessor. However, if the descriptor privilege level of the calling program indicates a higher privilege than that of the called program, then the transfer is not allowed by the 80386 microprocessor. For example, if a Ring 0 program attempts to transfer control to a Ring 3 program, the transfer is not allowed. Thus, by assigning a privilege level of 0 to critical code and a privilege level of 3 to application programs, the Microsoft Windows operating system prevents the application programs from corrupting the critical code.

Figure 4B:
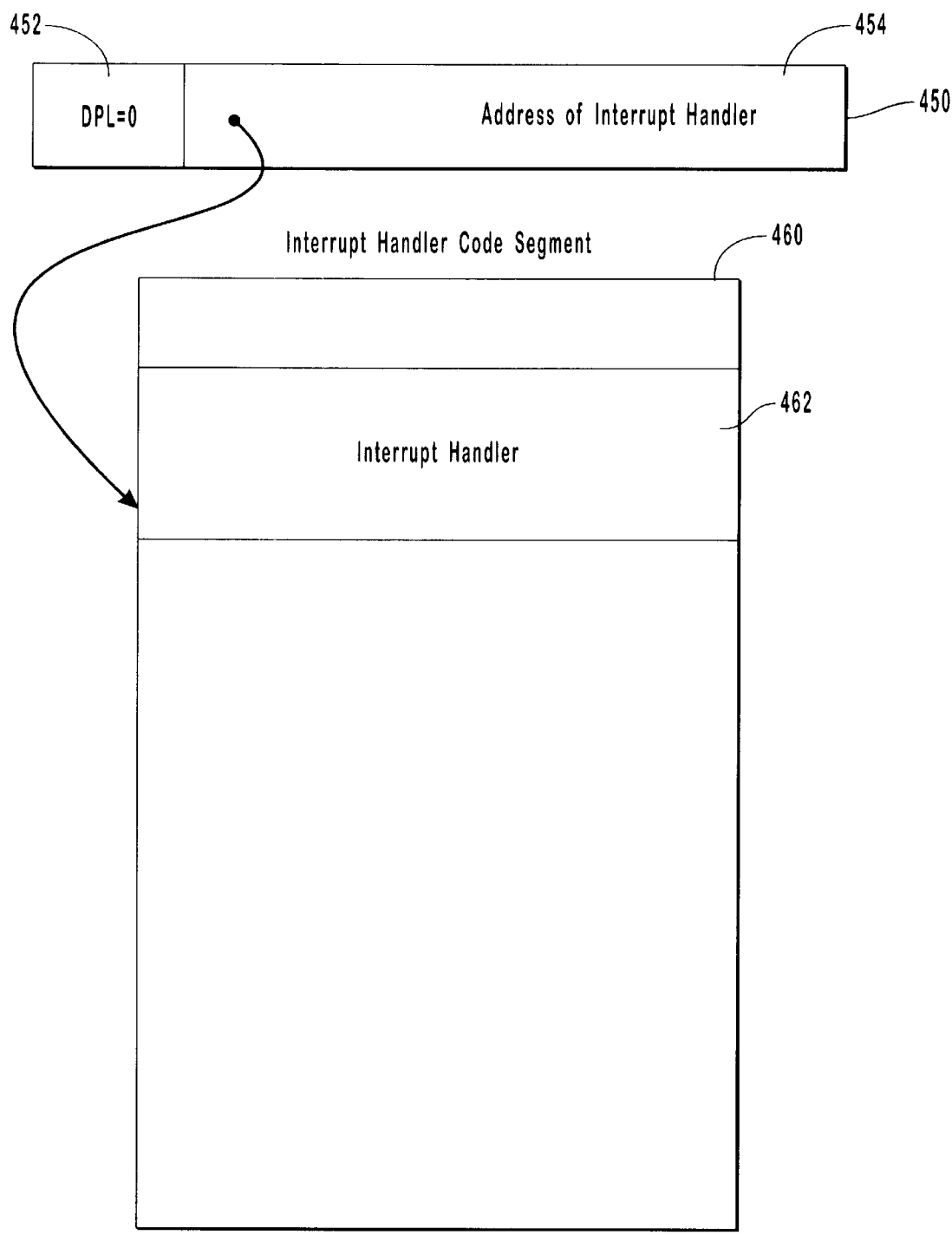
FIG. 4b is an illustration of a prior art code segment which stores a prior art interrupt handler routine.

The code segment which stores the prior art interrupt handler routine 214 from FIG. 2 is shown in FIG. 4b. In FIG. 4b, a code segment descriptor 450 is shown. The code segment descriptor 450 is an 80386 code segment descriptor which defines the interrupt handler code segment 460, which is an 80386 code segment. The code segment descriptor 450 includes a DPL 452 and an address 454 of the interrupt handler code 462. As discussed above, interrupt handlers, such as the interrupt handler routine 214 shown in FIG. 2, typically reside in Ring 0. Thus, the DPI, 452 is assigned the value of 0 (DPL=0). As a result, the interrupt handler routine 214 cannot call the application program 152 because the 80386 microprocessor would compare the descriptor privilege level assigned to the code segment for each program and determine that the calling interrupt handler routine (Ring 0) is more privileged than the called application (Ring 3). Thus, the 80386 microprocessor would not allow the transfer to the application.

Thus, when the interrupt is received, control is transferred to the interrupt handler routine 214, which cannot call the application program 152, and when the interrupt handler routine 214 returns, control transfers back to the interrupted task. For this reason, it has not been possible for the prior art computer system of FIG. 2 to execute the application program 152 at the time the interrupt is received by the CPU 140 indicating the requested data has been received by the UART 130.

Also, because the application code 412 calls the communications protocols 414 located in the same code segment 410, none of the communications protocols can be executed at the time the interrupt is received. Instead, the application program 1S2 is not executed in the prior art computer system until scheduled by the operating system 220, which was often not in time to prevent the data from being overwritten in the UART buffer 132 by new data as sent by the sending computer 110.

Figure 5:
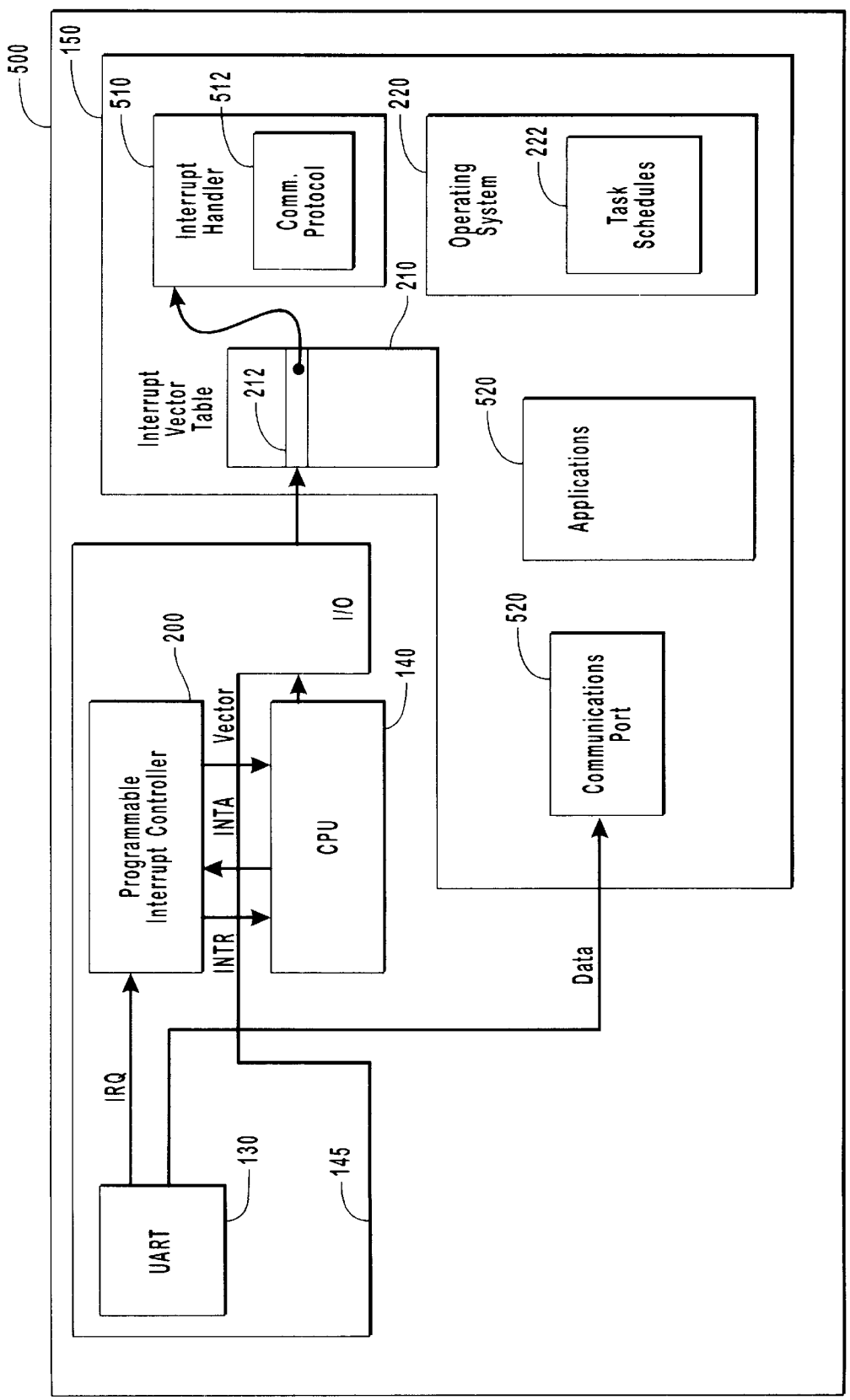
FIG. 5 is a block diagram of the computer system of the preferred embodiment of the present invention.

The present invention prevents the above-described problem of the data being overwritten in the UART buffer 132. The present invention ensures that the communications protocol that obtains the data from the communications interface will be executed when the interrupt is first received by the computer by providing the communications protocol the same privilege level as the interrupt handler routine. The inventive solution to this problem can be illustrated with reference to FIG. 5. FIG. 5 is a block diagram of the preferred computer system of the present invention. In FIG. 5. the computer 500 contains the CPU 140, the I/O unit 145 having the UART 130 and the programmable interrupt controller 200, and the memory 150. The memory 150 also contains the operating system 220 having the task scheduler 222, the communications port 156 and the protocol buffer 230. The memory 150 also stores the interrupt vector table 210 having the entry 212 pointing to an appropriate interrupt handler routine.

In the preferred computer system, the computer 500 stores in the memory 150 an interrupt handler routine 510 which invokes a communications protocol 512 having the same privilege level as the interrupt handler routine 510 by, for example, providing the communication protocol 512 within a same code segment as the interrupt handler 510. The communications protocol 512 obtains the data from the UART 130. An application program 520 is also stored in the memory 150 which contains, for example, the same application code as the prior art application program 152.

Because the communications protocol 512 is performed by the interrupt handler routine 510, however, the application 520 does not have to provide the communications protocol 512, as it did in the prior art. Also, because the communications protocol 512 is provided with a same privilege level as the interrupt handler routine 510, the communications protocol 512 is executed in the present invention as soon as the CPU 140 receives the interrupt request from the UART 130 and transfers control to the interrupt handler routine 510. Thus, the communications protocol 512 executes as soon as the interrupt is received by the CPU 140 from the programmable interrupt controller 200, to obtain the data from the UART 130. As a result, the data obtained by the communications protocol 512 before it is overwritten in the UART buffer 132.

Figure 6:
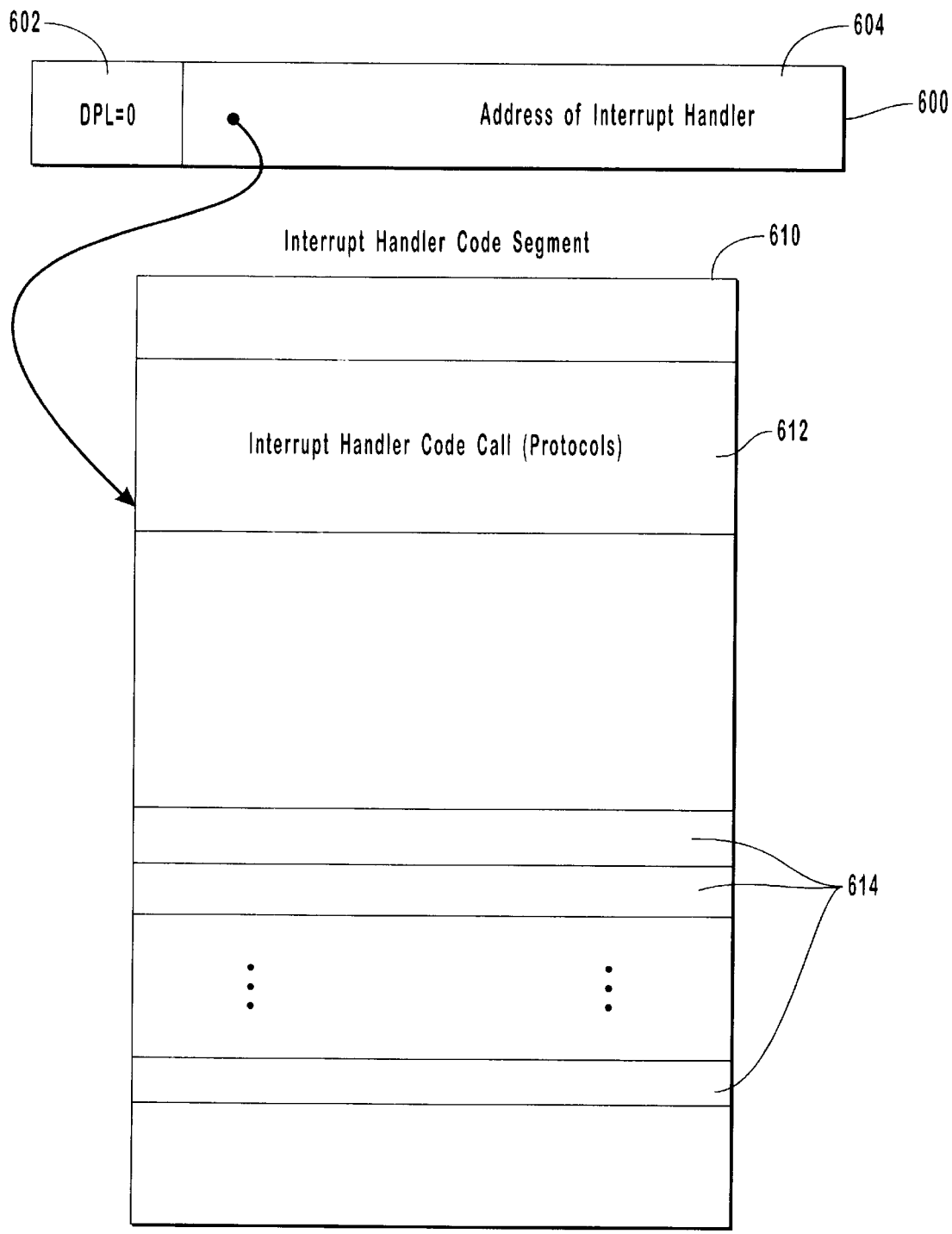
FIG. 6 is an illustration of the code segment which stores the interrupt handler routine in the preferred embodiment of the present invention.

In the preferred embodiment of the present invention, the CPU 140 is the 80386 microprocessor, and the operating system 220 is the Microsoft Windows operating system. The 80386 code segment which stores the interrupt handler routine 510 in the present invention is shown in FIG. 6. In FIG. 6, a code segment descriptor 600 is provided which is an 80386 code segment descriptor that includes a descriptor privilege level (DPL) 602 and an address 604 of the interrupt handler code in the interrupt handler routine 510. The code segment descriptor 600 describes an 80386 interrupt handler code segment 610 which contains the interrupt handler code 612 and one or more communications protocols 614, which include the communications protocol 512. Specifically, the communications protocols 614 may include the well-known XON/XOFF protocol, RTS/CTS protocol, ACK/NAK protocol, etc. As with conventional interrupt handler routines, the interrupt handler routine 510 resides in Ring 0, and thus the DPL 602 is assigned the value 0 (DPL=0). Thus, the communications protocols 614 provided in the same code segment 610 also have a privilege level of 0 (DPL=0), and are not prohibited from execution at interrupt time by the Microsoft Windows operating system.

Figure 7:
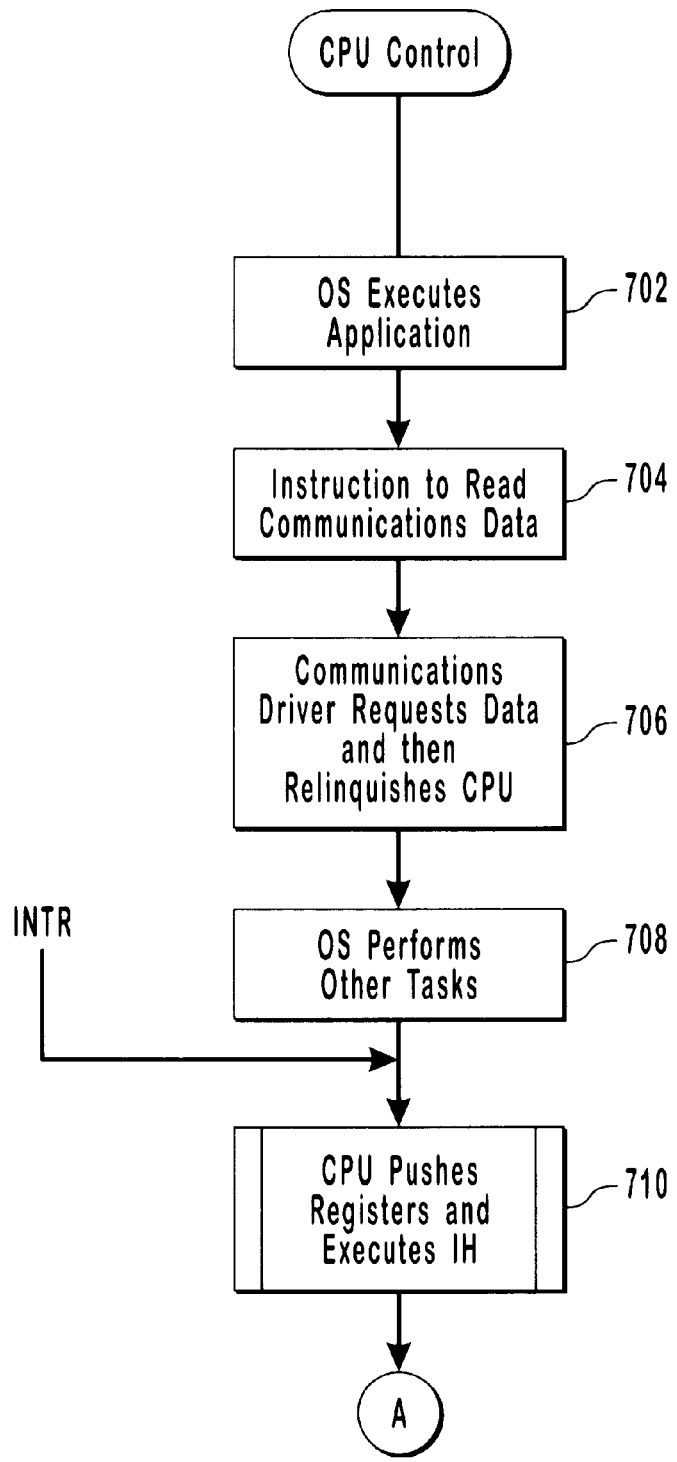
FIG. 7 is a general flow diagram of the control performed by both the computer system of the preferred embodiment and prior art computer system when an application executes an instruction to read data from a remote computer.

The operation of the inventive computer system of FIG. 5 will now be illustrated with respect to FIGS. 7 through 13. FIG. 7 is a general flow diagram of the control of the CPU 140 performed by both the inventive computer system and prior art computer system when an application executes an instruction to read data from the sending computer 110. FIG. 7 shows the steps performed by the CPU 140 up to the point where an interrupt is received from the UART 130. In step 702, the currently executing operating system 220 operates the CPU 140 to execute the application (152 or 620). In step 704, when the CPU 140 encounters an instruction in the application to read data from the sending computer 110 the CPU 140 transfers control to a communications driver (not shown) stored in the memory 150, which requests in step 706 the data from the sending computer 110 via the UART 130.

The application then relinquishes the CPU 140 to the operating system, which operates the CPU 140 in step 708 to perform other tasks, such as operating system routines or other applications. The CPU 140 (the 80386) performs these other tasks until an interrupt request signal (INTR) is received from the programmable interrupt controller 200. The CPU 140 then saves the currently executing task (by, for example, pushing the contents of appropriate registers to indicate the currently executing instructions and the status of the tasks currently being performed), and then transfers control to the appropriate interrupt handler routine. Where FIG. 7 illustrates the prior art method, step 710 transfers control to the prior art interrupt handler routine 214. Where FIG. 7 represents the inventive method, step 710 transfers control to the inventive interrupt handler routine 510.

Figures 8, 9:
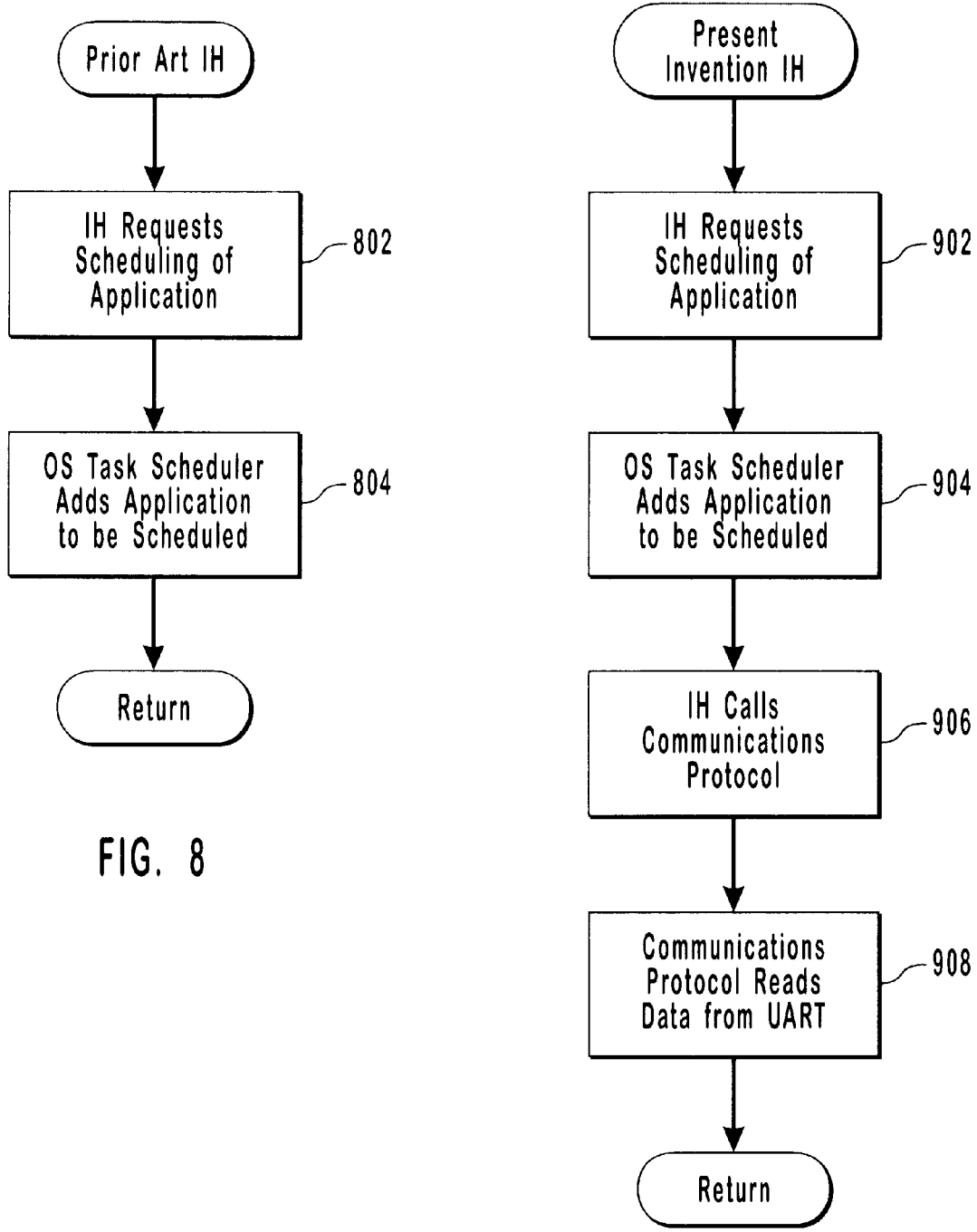
FIG. 8 is a flow diagram of the steps performed when the prior art interrupt handler routine is called.
FIG. 9 is a flow diagram of the steps performed when the interrupt handler routine of the preferred embodiment of the present invention is called.

The performance of the interrupt handler routine 510 can best be illustrated by first describing a prior art interrupt handler. In the prior art, when step 710 is performed, the interrupt handler routine to which the CPU transfers control is the prior art interrupt handler routine 214, which is illustrated by the flow diagram in FIG. 8. FIG. 8 is a flow diagram of the basic steps performed by the prior art interrupt handler routine 214 and operating system 220 when the interrupt handler routine 214 is called. In step 802, the interrupt handler routine 214 sends a request to the operating system 220 to engage the application program 152 to be scheduled for execution. In step 804, the operating system 220 responds to the request by operating the task scheduler 222 to engage the application program 152 to be scheduled for execution at a later time. The interrupt handler routine 214 then merely returns. At this point, in the prior art computer system, the requested data has not been obtained from the UART 130 and, thus may eventually be overwritten in the communications interface.

In the present invention, when step 710 is performed, the interrupt handler routine to which the CPU transfers control is the interrupt handler routine 510 which contains the communications protocol 512. FIG. 9 is a flow diagram of the basic steps performed by the interrupt handler routine 510 and operating system 220 when the interrupt handler routine 510 is called. In step 902, the interrupt handler routine 510 requests scheduling of the application 520 in the same fashion as does the interrupt handler 214 in the prior art computer system in step 802. Similarly, in step 904, the operating system 220 operates the task scheduler 222 to engage the application 620 to be scheduled for execution, also as is done by the prior art method in step 804.

In step 906, however, the interrupt handler routine 510 then calls the communications protocol 512 which is provided within the same code segment of the interrupt handler routine 510. In step 908, the communications protocol 512 is executed to obtain the data from the UART 130, which places the data into the port 156 in the computer 500. At this time, additional communications protocols may also be executed to control the flow of the data from the UART 130 to the port 156, from the port 156 to the CPU 140, and so on. Having obtained the data, the interrupt handler routine 510 then returns.

Figure 10:
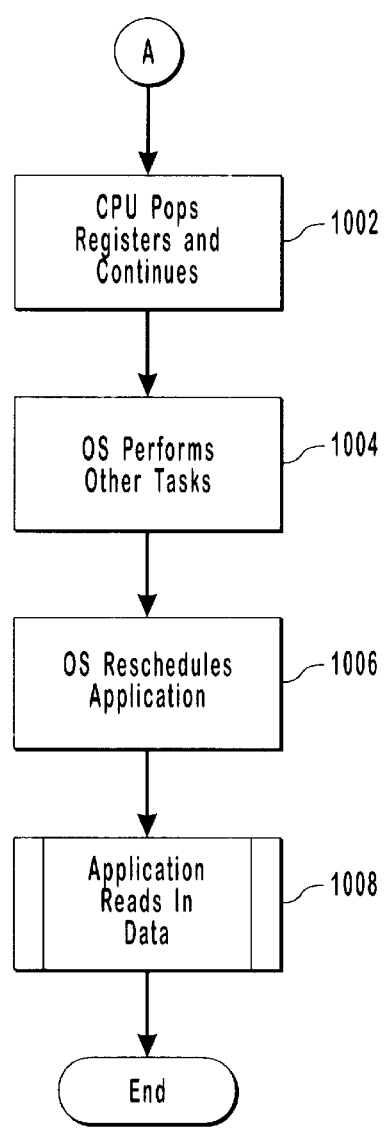
FIG. 10 illustrates the control performed by both the computer system of the preferred embodiment and the prior art computer system after the interrupt handler routine returns.
Figure 11:
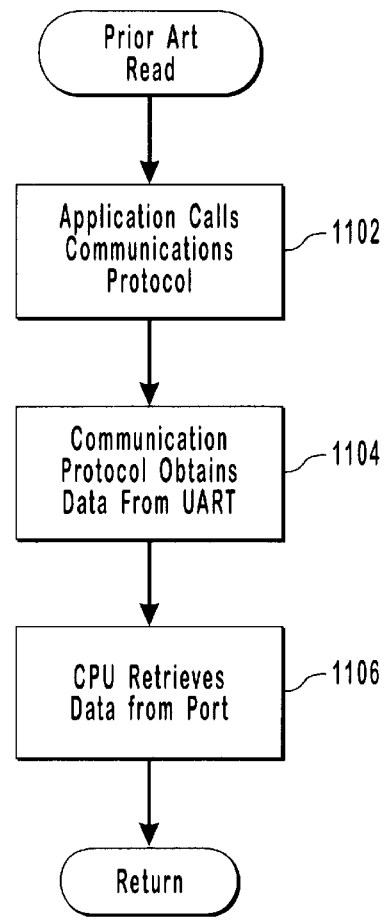
FIG. 11 is a flow diagram of the steps performed in the prior art when an application reads in data that has been written to the communications interface.

FIG. 10 illustrates the CPU control performed by both the inventive computer system and the prior art computer system after the interrupt handler routine (214 or 510) returns. In step 1002, the CPU 140 retrieves the previously executing task (by, for example, obtaining previously saved contents of appropriate registers which indicate the previously executing instructions and status information of the previously executing task from the operating system stack). The CPU 140 then continues execution where it previously left off before executing the interrupt handler routine (214 or 610). In step 1004, the operating system operates the CPU 140 to continue to execute the previously executing task and any other scheduled tasks. During this time, an unpredictable amount of time passes, which may be long enough for any data currently being sent to the UART 130 to completely fill the UART buffer 132 and begin to overwrite data previously written therein. In step 1006, the operating system schedules the application program (152 or 620) as prioritized by the task scheduler 222. In step 1008, the application program (152 or 620) is executed to read the data that has been sent by the remote computer.

The performance of the present invention to read in the data can best be illustrated by first briefly describing the prior art. In the prior art, when the application program 152 reads the data in step 1008 of FIG. 10, the CPU 140 performs the steps in the flow diagram shown in FIG. 11. In step 1102, the application program 152 calls the communications protocol 154 included therein to obtain the data. In step 1104, the communications protocol obtains the data from the UART 130, which places the data into the port 156. Because any length of time may have passed since the data was originally requested from the sending computer 110, there is no guarantee that the data in the UART buffer 132 which was placed into the communications port 156 in step 1104 corresponds to the data originally requested. In step 1106, the CPU 140 retrieves the data from the port 156 and provides the data to the application program 152.

Figure 12:
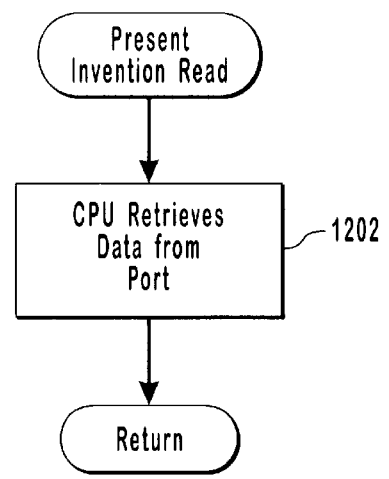
FIG. 12 is a flow diagram of the steps performed in the preferred embodiment of the present invention when an application reads in data that has been written to the communications interface.

In the present invention, when the application 520 reads in the data in step 1008 of FIG. 10, the CPU 140 performs the steps in the flow diagram shown in FIG. 12 to read the data. In step 1202, the CPU 140 retrieves the data from the port 156. The data has been obtained by the communications protocol 612 provided within the interrupt handler 510 as soon as the interrupt is received by the CPU 140 indicating that the data had been received by the UART 130. Thus, it is ensured that the data read by the CPU 140 corresponds to the originally requested data because it has been placed into the port 156 before being overwritten within the UART buffer 132 by new data from the sending computer 110.

Although the present invention has been described with reference to a specific embodiment, it should be appreciated that one of ordinary skill in the art may make various changes in the form and scope of the invention without departing from the spirit of the invention. For simplicity of explanation, the invention has been described primarily with reference to a single communications protocol executable to obtain the data from a communications interface. It will be appreciated, however, that any number of communications protocols necessary or desirable to control the flow of inbound data can be implemented within the interrupt handler provided in accordance with the present invention. As a result, an application executing on the inventive computer system is alleviated from the responsibility of providing these communications protocols. The scope of the invention is defined by the claims.

What is claimed and desired to be secured by United States Letters Patent is:

1. In a computer having a memory and executing an operating system which allows a first routine having a defined privilege level to invoke a second routine having an equal privilege level, a method for executing a communications protocol that obtains data from a communications interface within the computer, the communications interface communicating with an external device coupled to the computer, the method comprising the steps of:

storing in the memory an interrupt handler routine which invokes the communications protocol, the interrupt handler routine having an interrupt privilege level and performing multiple communications protocols having a protocol privilege level which is equal to the interrupt privilege level; and executing the interrupt handler routine when an interrupt is received from the communications interface indicating the data has been received by the communications interface, including invoking the multiple communications protocols, thereby obtaining the data from the communication is interface.

2. The method of claim 1 wherein the multiple communications protocols include an XON/XOFF protocol.

3. The method of claim 1 wherein the multiple communications protocols include an ACK/NAK protocol.

4. In a computer system including a sending computer and receiving computer having an application program for requesting data from the sending computer, wherein the receiving computer receives the data and stores the data in a buffer of a communications interface at the receiving computer, a method for implementing an interrupt-responsive and timely execution of a communications protocol routine at a CPU of the receiving computer to obtain the data from the buffer, the communications protocol routine being invoked by an interrupt handler routine rather than by the application program so as to reduce latency in obtaining the data from the buffer, the method comprising the steps of:

requesting the data from the sending computer by the application program;

while awaiting arrival of the data from the sending computer, initiating execution of a task on the CPU other than a task of the application program;

receiving the data at the receiving computer;

sending an interrupt from the communications interface to the CPU;

suspending execution of the task on the CPU;

executing the interrupt handler routine on the CPU in response to the interrupt, including calling the communications protocol routine;

executing the communications protocol routine so as to store the data in a communications port in a memory of the receiving computer;

resuming execution of the task at the CPU; and only after the communications protocol routine has been executed and the data has been stored in the communications port, resuming execution of the application program at the CPU, including the step of reading the data from the communications port by the application program.

* * * * *

UNITED STATES PATENT AND TRADEMARK OFFICE
CERTIFICATE OF CORRECTION

PATENT NO. : 6,092,144
DATED : July 18, 2000
INVENTOR(S) : David Thielen

It is certified that error appears in the above-identified patent and that said Letters Patent are hereby corrected as shown below:

Col. 3, ln. 1: after "execution" change "arc" to --are--

Col. 6, ln. 26: after "system" change "200" to --220--

Col. 6, ln. 39: after "16450" change "UARF" to --UART--

Col. 8, ln. 23: after "program" change "1S2" to --152--

Col. 12, ln. 6: change "communication is" to --communications--

Signed and Sealed this

Eighth Day of May, 2001

Attest:

NICHOLAS P. GODICI

Attesting Officer     Acting Director of the United States Patent and Trademark Office